United States Patent
Brewster et al.

(10) Patent No.: US 9,091,067 B2
(45) Date of Patent: *Jul. 28, 2015

(54) STRUCTURED-CORE LAMINATE PANELS AND METHODS OF FORMING THE SAME

(71) Applicant: 3form, LLC, Salt Lake City, UT (US)

(72) Inventors: M. Hoyt Brewster, Salt Lake City, UT (US); Charles H. Moore, Salt Lake City, UT (US); John E. C. Willham, Sandy, UT (US)

(73) Assignee: 3form, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/244,135

(22) Filed: Apr. 3, 2014

(65) Prior Publication Data
US 2014/0215964 A1    Aug. 7, 2014

Related U.S. Application Data

(60) Continuation of application No. 14/028,719, filed on Sep. 17, 2013, which is a division of application No.
(Continued)

(51) Int. Cl.
*B32B 3/12* (2006.01)
*A47H 15/00* (2006.01)
(Continued)

(52) U.S. Cl.
CPC ... *E04C 2/24* (2013.01); *B32B 3/12* (2013.01); *B32B 7/02* (2013.01); *E04B 9/045* (2013.01);
(Continued)

(58) Field of Classification Search
CPC ...... B29K 2021/00; B32B 37/10; B32B 3/12; B32B 27/36; B32B 7/02; B29C 63/36; B29C 43/12; B29C 65/18; E04C 2/24; E04C 2/54; E04C 2/20; E04B 9/045; B23B 3/12; Y10T 428/157; Y10T 428/24942; Y10T 428/24149
USPC .......... 156/242, 245, 285, 286, 293; 428/116, 428/117, 118, 212
See application file for complete search history.

(56) References Cited

U.S. PATENT DOCUMENTS

| | | | |
|---|---|---|---|
| 2,785,286 A | 3/1957 | Lichtgarn | |
| 3,103,042 A | 9/1963 | Martin | |

(Continued)

FOREIGN PATENT DOCUMENTS

| | | |
|---|---|---|
| EP | 0857244 | 8/2000 |
| JP | 03019464 U9 | 10/1995 |

(Continued)

OTHER PUBLICATIONS

International Search Report and Opinion of PCT/US2012/059824, Mailed Feb. 28, 2013.
(Continued)

*Primary Examiner* — Katherine Mitchell
*Assistant Examiner* — Jeremy Ramsey
(74) *Attorney, Agent, or Firm* — Workman Nydegger (57) ABSTRACT

A structured-core laminate panel can be made in an efficient, structurally sound manner without the use of adhesives (film or liquid forms) using materials with different melt or glass transition temperatures. In one implementation, a manufacturer positions one or more resin substrates about a structured core, which comprises a relatively high melt or glass transition temperature compared with that of the one or more resin substrates. The manufacturer heats the assembly to at least the glass transition temperature of the resin substrates, but not to the melt or glass transition temperature of the structured core. This allows the one or more resin substrates to melt and bond (mechanically, chemically, or both) to the structured core on one side (or inner surface), while maintaining a substantially planar or original conformation on an opposing side (or outer surface).

24 Claims, 7 Drawing Sheets

Related U.S. Application Data

13/318,771, filed as application No. PCT/US2010/034349 on May 11, 2010.

(60) Provisional application No. 61/177,939, filed on May 13, 2009.

(51) Int. Cl.

| | |
|---|---|
| *A47H 13/00* | (2006.01) |
| *E06B 3/00* | (2006.01) |
| *E06B 9/00* | (2006.01) |
| *E04C 2/24* | (2006.01) |
| *E04B 9/04* | (2006.01) |
| *E04B 9/32* | (2006.01) |
| *E04C 2/20* | (2006.01) |
| *E04C 2/36* | (2006.01) |
| *E04C 2/54* | (2006.01) |
| *E04F 10/00* | (2006.01) |
| *E06B 5/00* | (2006.01) |
| *B32B 7/02* | (2006.01) |

(52) U.S. Cl.
CPC ... *E04B 9/32* (2013.01); *E04C 2/20* (2013.01); *E04C 2/36* (2013.01); *E04C 2/54* (2013.01); *E04F 10/00* (2013.01); *E06B 5/00* (2013.01); *B32B 2419/04* (2013.01); *B32B 2607/00* (2013.01); *Y10T 428/24149* (2015.01); *Y10T 428/24157* (2015.01); *Y10T 428/24942* (2015.01)

(56) References Cited

U.S. PATENT DOCUMENTS

| | | | |
|---|---|---|---|
| 3,379,603 A | 4/1968 | Barnette | |
| 3,676,267 A | 7/1972 | Fairbanks | |
| 3,676,276 A | 7/1972 | Hirshen | |
| 3,847,701 A | 11/1974 | Fairbanks | |
| 3,936,565 A | 2/1976 | Good | |
| 4,061,812 A | 12/1977 | Gilwee | |
| 4,249,976 A | 2/1981 | Hudson | |
| 4,315,050 A | 2/1982 | Rourke | |
| 4,475,624 A | 10/1984 | Bourland | |
| 4,581,867 A | 4/1986 | Crowley | |
| 4,728,556 A | 3/1988 | Igawa et al. | |
| 4,902,365 A | 2/1990 | Westlake | |
| 4,925,721 A | 5/1990 | Harper-Tervet | |
| 5,032,443 A | 7/1991 | Rietdijk | |
| 5,096,526 A | 3/1992 | Engwall | |
| 5,139,596 A | 8/1992 | Fell | |
| 5,186,999 A | 2/1993 | Brambach | |
| 5,192,482 A | 3/1993 | Brambach | |
| 5,316,604 A | 5/1994 | Fell | |
| 5,328,744 A * | 7/1994 | Kaufmann et al. | 428/116 |
| 5,895,701 A | 4/1999 | Givoni | |
| 6,039,832 A * | 3/2000 | McCarville | 156/292 |
| 6,107,976 A | 8/2000 | Purinton | |
| 6,500,516 B2 * | 12/2002 | Bourlier et al. | 428/116 |
| 6,630,221 B1 | 10/2003 | Wong | |
| 6,673,415 B1 | 1/2004 | Yamazaki | |
| 6,730,386 B1 | 5/2004 | Stahlke | |
| 7,281,353 B2 | 10/2007 | Konstantin | |
| 8,070,994 B2 | 12/2011 | Carlson | |
| 2001/0042593 A1 * | 11/2001 | Zhou et al. | 156/307.1 |
| 2005/0003148 A1 * | 1/2005 | Myles et al. | 428/116 |
| 2005/0136198 A1 | 6/2005 | Bourlier | |
| 2006/0134408 A1 | 6/2006 | Kaneko | |
| 2007/0132278 A1 | 6/2007 | Lester | |
| 2008/0086982 A1 | 4/2008 | Parenteau | |
| 2008/0131661 A1 * | 6/2008 | Albers et al. | 428/139 |
| 2010/0062211 A1 | 3/2010 | Kawazoe | |
| 2010/0307063 A1 * | 12/2010 | Bouthillier | 49/425 |
| 2012/0048451 A1 * | 3/2012 | Carlson et al. | 156/83 |
| 2012/0048487 A1 | 3/2012 | Brewster | |
| 2012/0164367 A1 | 6/2012 | Delmas | |
| 2014/0000193 A1 | 1/2014 | Daniels | |
| 2014/0013691 A1 | 1/2014 | Brewster | |

FOREIGN PATENT DOCUMENTS

| | | |
|---|---|---|
| JP | 2753631 | 5/1998 |
| JP | 2934048 | 8/1999 |
| JP | 2006-083507 A | 3/2006 |
| JP | 2006-289678 | 10/2006 |
| KR | 20-0414348 | 4/2006 |
| KR | 2004143480000 | 4/2006 |
| KR | 20-0431041 | 11/2006 |
| KR | 10-2010-0021174 | 2/2010 |
| WO | 2004076167 A1 | 9/2004 |

OTHER PUBLICATIONS

International Search Report and Opinion of PCT/US2010/034349, Mailed Jan. 24, 2011.

Owens Corning Uniconform; Sep. 15, 2010 Accessed Jan. 9, 2015 from http://owenscorning. mediaroom.com/index.php?s=2370&item=13544.

KEMI Swedish Chemicals Agency; Bishpenol A (BPA); accessed Jan. 9, 2015 from https://www.kemi.se/en/Content/In-focus/Bisphenol-A/.

* cited by examiner

STRUCTURED-CORE LAMINATE PANELS AND METHODS OF FORMING THE SAME

CROSS-REFERENCE TO RELATED APPLICATIONS

The present application is a Continuation of U.S. patent application Ser. No. 14/028,719 filed on Sep. 17, 2013, titled "Structured-Core Laminate Panels and Methods of Forming the Same," which is a Divisional of U.S. patent application Ser. No. 13/318,771 filed on Nov. 3, 2011, which is a 371 national stage of PCT/US10/34349, filed May 11, 2010, entitled "Structured-Core Laminate Panels and Methods of Forming the Same," which claims the benefit of priority to U.S. Provisional Application No. 61/177,939, filed May 13, 2009, entitled "Laminated Structured-Core Panels." The entire content of each of the aforementioned patent applications is incorporated by reference herein.

BACKGROUND OF THE INVENTION

1. The Field of the Invention

This invention relates to apparatus, systems, and methods for panels that can be used as a ceiling, wall, or floor structure, or as a treatment thereto.

2. Background and Relevant Art

Recent trends in building design involve using one or more sets of decorative panels to add to the functional and/or aesthetic characteristics of a given structure or design space. These recent trends are due, at least in part, because there is sometimes more flexibility with how the given panel (or set of panels) is designed, compared with the original structure. For example, recent panel materials include synthetic, polymeric resin materials, which can be formed as panels to be used as partitions, walls, barriers, treatments, décor, etc. Examples of such resin materials include polyvinyl chloride or "PVC"; polyacrylate materials such as poly (methyl methacrylate) or "PMMA"; polyester materials such as poly (ethylene-co-cyclohexane 1,4-dimethanol terephthalate), or "PET"; poly (ethylene-co-cyclohexane 1,4-dimethanol terephthalate glycol) or "PETG"; glycol modified polycyclohexylenedimethlene terephthalate; or "PCTG"; as well as polycarbonate (or "PC") materials.

In general, resin materials such as these are now popular compared with decorative cast or laminated glass materials, since resin materials may be manufactured to be more resilient and to have a similar transparent, translucent, or decorative appearance as cast or laminated glass, but with less cost. Decorative resins can also provide more flexibility compared with glass at least in terms of color, degree of texture, gauge, impact resistance, and ease of fabrication.

One particular type of resin panel that is now popular is honeycomb core panels. Honeycomb core panels include a honeycomb core bonded between two outer sheets or skins. Such panels are popular because the core reduces the overall weight of the panel, while also increasing the strength of the panel. Furthermore, the honeycomb core can provide a unique aesthetic.

One conventional mechanism for creating honeycomb core laminate panels can involve adhering a honeycomb core between two substrates with an adhesive. The adhesive may be liquid at the time of application, which allows the honeycomb core and substrates to bond together with relative immediacy. To apply the adhesive, the manufacturer may spread (e.g., with one or more rollers) or spray a liquid adhesive on both sides of a honeycomb core or to a single side of one or more substrate panels, or skins, and then press such panels directly against the honeycomb core. Such liquid laminations, however, may be relatively weak in the context of building materials. In particular, such liquid laminations can have a greater risk of delamination since the bond strength can be primarily determined by uniformity of the liquid adhesive application, which is susceptible to bubbles, voids, debris, and relies on chemical bonding.

In other cases, a manufacturer can utilize a solid resin film adhesive. For example, the manufacturer first adheres, laminates, or attaches a solid adhesive resin film on one side of one or more substrate panels. The manufacturer then performs a second step of adhering the substrate panels to both sides of the honeycomb core. The adhesion is achieved via the application of heat (and, also pressure in some cases), which causes the adhesive resin film to become tacky, and bond the honeycomb core and substrates together albeit with a primarily chemical bond.

As with the liquid adhesive, applying a solid adhesive may not necessarily form a sufficiently strong bond between the substrates and the honeycomb core for use as a building material. Also, similar to a liquid adhesive, the strength of solid adhesives can be dependent upon a uniform bond and a lack of bubbles, voids, and debris. Furthermore, with a film adhesive that needs heat and pressure to melt and form the ensuing bond, there is a risk of the processing temperatures (and pressures in some cases) will melt the substrates and/or honeycomb core. This risk is enhanced when the resin adhesive layer, the substrates, and honeycomb core comprise similar resin materials with similar melting/glass transition temperatures. Lastly, solid adhesives tend to be expensive and the additional processing steps associated therewith increase the chances for reduced product yield due to entrapped contaminants (dirt, debris, air, etc) to the exposed adhesive portion of the skin material.

BRIEF SUMMARY OF THE INVENTION

Implementations of the present invention solve one or more of the foregoing or other problems in the art with systems, methods, and apparatus configured to efficiently produce structured-core laminate panels. Specifically, implementations of the present invention comprise apparatus and methods for laminating one or more resin substrate panels to one or more structured cores using primarily heat and pressure that selectively melts or softens some components (at least in part) but not others. In at least one implementation, a manufacturer can create a uniform structured-core laminate panel with sufficient structural properties for use as a building material without the use of any adhesives. In particular, the manufacturer can create a solid structure in which the resin substrates are melted and bonded to the structured honeycomb core.

For example, one implementation of a method of manufacturing a translucent, structured-core laminate panel in a manner that substantially resists delamination can involve preparing a laminate assembly. The laminate assembly can include one or more resin substrates, which have a first glass transition temperature, positioned about a structured core having a second melt or glass transition temperature. The first glass transition temperature of the resin substrates can be lower than the second melt or glass transition temperature of the structured honeycomb core.

The method can also involve heating the laminate assembly to a processing temperature at least as great as the first glass transition temperature, but below the second melt or glass transition temperature; wherein a portion of the one or more resin substrates flows into the structured core. Additionally, the method can involve cooling the laminate assembly below the first glass transition temperature to create a structured-core laminate panel. The one or more resin substrates can bond to the structured core without substantial deformation of the structured core, and without the use of an adhesive film between the one or more resin substrates and the structured core.

An implementation of a structured-core laminate panel with sufficient structural properties for use as a building component can comprise at least one resin substrate having a first glass transition temperature. The structured-core laminate panel can also include at least one structured-core positioned directly against a first surface of the at least one resin substrate. The at least one structured core can comprise a plurality of cells, and have a second melt or glass transition temperature that is substantially higher than the first glass transition temperature. A portion of the at least one resin substrate positioned directly against the at least one structured core is fused to and within the plurality of cells of the at least one structured core.

Furthermore, a panel system configured for use as a partition that provides both light transmission and privacy can include one or more translucent structured-core laminate panels. The one or more translucent structured-core laminate panels can include one or more resin substrates having a first glass transition temperature. Additionally, the one or more translucent structured-core laminate panels can include one or more structured cores including a plurality of cells. The one or more structured cores can have a second melt or glass transition temperature that is greater than the first glass transition temperature. Further, a portion of the one or more resin substrates can extend into and be fused to the plurality of cells of the one or more structured cores. The panel system can also include a mounting system that secures the one or more translucent structured-core laminate panels to a support structure.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatus configured to efficiently produce structured-core laminate panels. Specifically, implementations of the present invention comprise apparatus and methods for laminating one or more resin substrate panels to one or more structured cores using primarily heat and pressure that selectively melts or softens some components (at least in part) but not others. In at least one implementation, a manufacturer can create a uniform structured-core laminate panel with sufficient structural properties for use as a building material without the use of any adhesives. In particular, the manufacturer can create a solid structure in which the resin substrates are melted and bonded to the structured honeycomb core.

In general, and as understood more fully herein, a manufacturer can use resin materials that have different glass transition temperatures to melt the interface layers of the resin substrate(s) adjacent a polymer-based structured core (e.g., honeycomb cellular structure). Specifically, the manufacturer uses a structured core (having cells with any number of different sizes and formations/alignments) prepared from a polymer-based material having relatively high glass transition temperature, and one or more resin sheets having a relatively low glass transition temperature. In at least one implementation, the relatively high glass transition temperature material comprises polycarbonate, and/or composites or mixtures thereof. By contrast, in at least one implementation, the relatively low glass transition temperature material of the resin substrate(s) used in lamination comprises a copolyester material, acrylic material, and/or composites or mixtures thereof.

The difference in melt or glass transition temperatures between the resin substrates and the structured core can allow a manufacturer to heat and press a portion of the resin substrates into the cells of the structured core without melting or otherwise compromising the structure or strength of the structured core. Upon cooling, portions of the resin substrates within the structured core can form a mechanical bond unifying the resin substrates and the structured core. In some implementations, in addition to the mechanical bond, a chemical bond can form between the resin substrates and the structured core.

In any event, the bond between the resin substrates and the structured core can be stronger than chemical bonds formed by adhesives. Furthermore, in some implementations, the strength of the bond is independent of uniformity or a lack of bubbles, voids, and debris. Thus, implementations of the present invention can allow for repeated formation of structurally sound panels without the risk of panels with a defective bond.

Implementations of the present invention can thus produce strong and aesthetically pleasing structured-core laminate panels. In particular, structured-core laminate panels of the present invention can be lightweight due to the cellular structured-core, yet durable and strong. In particular, structured-core laminate panels of the present invention can have load-bearing characteristics and properties sufficient to allow manufacturers to use the panels as building materials. In particular, structured-core laminate panels of the present invention can be sufficiently strong to avoid delamination even under extreme conditions, such as dynamic and static loads, wide fluctuations in temperature, peeling forces or forceful impacts.

Additionally, as mentioned previously, in addition to excellent structural properties, structured-core laminate panels of the present invention can also provide unique and desirable aesthetics. For example, implementations of structured-core laminate panels can be translucent and allow light transmission there through. Designers can use such translucent structured-core laminate panels in lighting applications, such as light boxes, or as window coverings. Furthermore, the structured core and/or colors of the panels can provide varying degrees transparency/translucency, and thus, varying degrees of privacy. Thus, designers can use structured-core laminate panels of the present invention as partitions, doors, or dividers where varying degrees of privacy are desired.

Accordingly, and as will be appreciated more fully from the following specification and claims, a structured-core laminate panel in accordance with an implementation of the present invention can have aesthetic and functional versatility, and function in a wide variety of installations. In particular, designers can use the structured-core laminate panels described herein in any number of ceiling, floor, or wall applications, whether in indoor or outdoor environments, including any residential, commercial, or industrial environments. For example, structured-core laminate panels described herein can serve a primarily functional or structural use as a building component. In addition, the structured-core laminate panels described herein can function primarily for aesthetic/decorative use, such as to apply a particular look, and/or texture to a wall, column, or lighting element/arrangement in an interior or exterior space.

Figure 1:
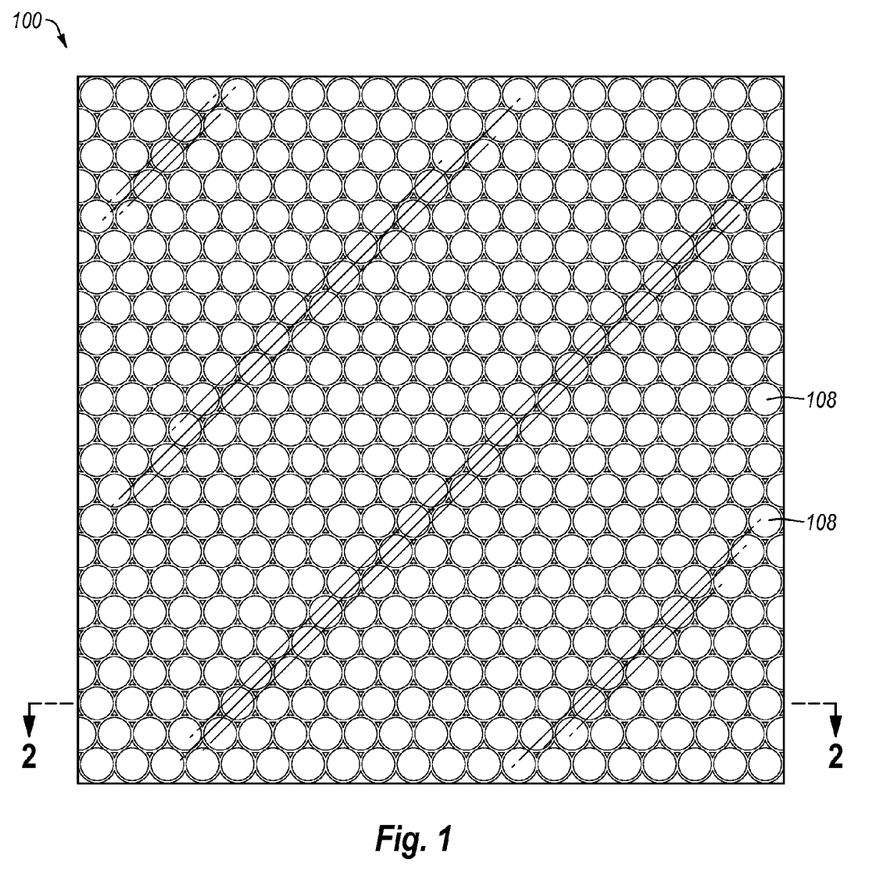
FIG. 1 illustrates a facing view of a structured-core laminate panel surface in accordance with an implementation of the present invention.
Figure 2:
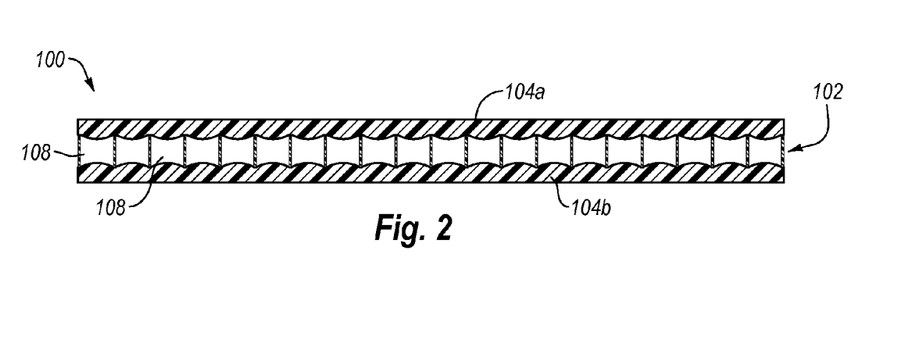
FIG. 2 illustrates a cross-sectional view of the structured-core laminate panel of FIG. 1 taken along the line 2-2 of FIG. 1.

Referring now to the Figures, FIGS. 1 and 2 illustrate a top view and side view, respectively, of a structured-core laminate panel 100. The structured-core laminate panel 100 comprises a structured-core 102 laminated to one or more resin substrates 104(a, b). As shown by FIG. 2, in some implementations of the present invention the structured-core laminate panel 100 includes a structured core 102 laminated between opposing upper 104a and lower 104b resin substrates. In alternative implementations, however, the structured-core laminate panel 100 can comprise a structured core 102 laminated to a single resin substrate 104.

As used herein, the terms "resin-based substrate," "resin substrate," "polymer-based substrate," "polymer substrate," "resin-based sheet" or "resin sheet" means a substrate comprising materials of one or more layers or sheets formed from any one of the following thermoplastic polymers (or alloys thereof). Specifically, such materials include but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like. Furthermore, the resin substrates can include other thermoplastic polymers or thermoplastic polymer blends, or combinations and mixtures thereof. In addition, any given resin substrate or sheet can include one or more resin-based substrates and any number other layers or coatings.

For example, the structured-core laminate panel 100 shown in FIGS. 1 and 2 includes single-layered resin substrates 104a, 104b. One will appreciate, however, that the structured-core laminate panel 100 can alternatively comprise a laminate of multiple resin-based substrates 104 of the same or different materials as those described above. The resin substrates 104 can vary in thickness to include a range from relatively thin gauge films to thicker gauge sheets (e.g., greater than about one-sixteenth inch (1/16") to about 5 inches (5")).

For example, in some implementations, the gauge of the structured-core laminate panel 100 in at least one implementation can be anywhere from about one-sixteenth inch (1/16") to about two inches (2") inches. The thickness of the structured-core laminate panel 100 can be based at least partially on the number of resin-based substrates it comprises, as well as the desired end-use. Furthermore, when upper 104a and lower 104b resin substrates are used, as in the structured-core laminate panel 100 of FIGS. 1 and 2, the upper resin substrate 104a can comprise the same thermoplastic materials as the lower resin substrate 104b. Alternatively, the upper 104a and lower 104b resin substrates can comprise differing thermoplastic materials.

In any event, the resin substrates 104 can include thermoplastic materials that a manufacturer can heat sufficiently above their glass transition temperature to soften, and then subsequently cool to solid form. More specifically, the resin substrates 104 can have a glass transition temperature lower than the melt or glass transition temperature of the structured core 102. Thus, one will appreciate that a manufacturer can select the thermoplastic materials of the resin substrates 104 based upon the materials of the structured core 102, or vice versa. As explained in greater detail below, the differences in melt or glass transition temperatures between the resin substrates 104 and the structured core 102 can allow a manufacturer to soften and press a portion of the resin substrates 104 into the cells 108 of the structured core 102 without melting or otherwise compromising the structure or strength of the structured core 102.

As used herein, the term "structured-core" means a structure including a plurality of cells or hollow chambers. For example, the structured-core 102 of FIGS. 1 and 2 includes a plurality of cylindrically-shaped cells 108. In alternative implementations, the structured core 102 can comprise honeycomb cells or cells of virtually any other shape or size. For instance, the structured-core can include cells having a tubular, diamond, square, circular, or virtually any other shape. No matter the configuration, the structured-cores of the present invention can include cells or hollow chambers within which softened or melted resin of the resin substrates 104 can flow into create a mechanical bond as explained in greater detail below. For example, as shown by FIGS. 1 and 2, the structured core 102 can include cylindrically-shaped cells 108 that are oriented perpendicularly to the abutting surfaces of the resin substrates 104a, 104b.

The structured core 102 can comprise thermoplastic materials, such as those previously mentioned in relation to the resin substrates 104. In alternative implementations, the structured core 102 can comprise glass, metal or other materials. Thus, the structured core 102 can comprise a wide variety of materials so long as the structured core has a higher melt or glass transition or melting temperature than that of the outer, adjacent resin substrate(s) 104. As mentioned previously, the higher melt or glass transition or melting temperature of the structured core 102 can ensure that a manufacturer can soften or melt the resin substrates 104 sufficiently to press a portion of the resin substrates into the structured core 102, without softening (at least not in a damaging way) the structured core 102.

In any case, in at least one implementation, the resin substrates 104a, 104b and/or the structured core 102 (or both) can be substantially translucent or transparent. Indeed in some implementations, at least the structured core 102 is substantially translucent, such that a significant amount of light can pass through the structured-core laminate panel 100. As previously mentioned, a manufacturer can use such translucent structured-core laminate panels 100 in lighting applications or as a semi-private divider. In alternative implementations, the resin substrates 104a, 104b and/or the structured core 102 (or both) can be opaque.

Figure 3A:
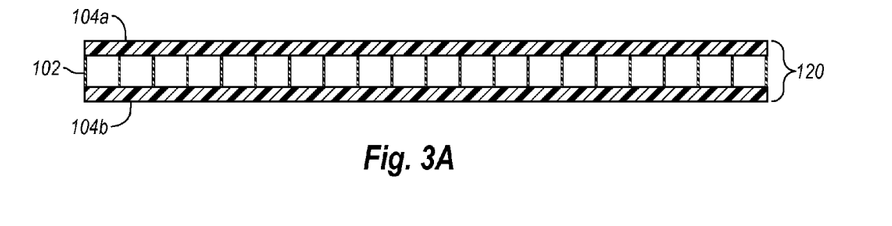
FIG. 3A illustrates a side, cross-sectional view of a laminate assembly in accordance with an implementation of the present invention that a manufacturer may use in forming a structured-core laminate panel, such as shown in FIGS. 1-2.
Figure 3B:
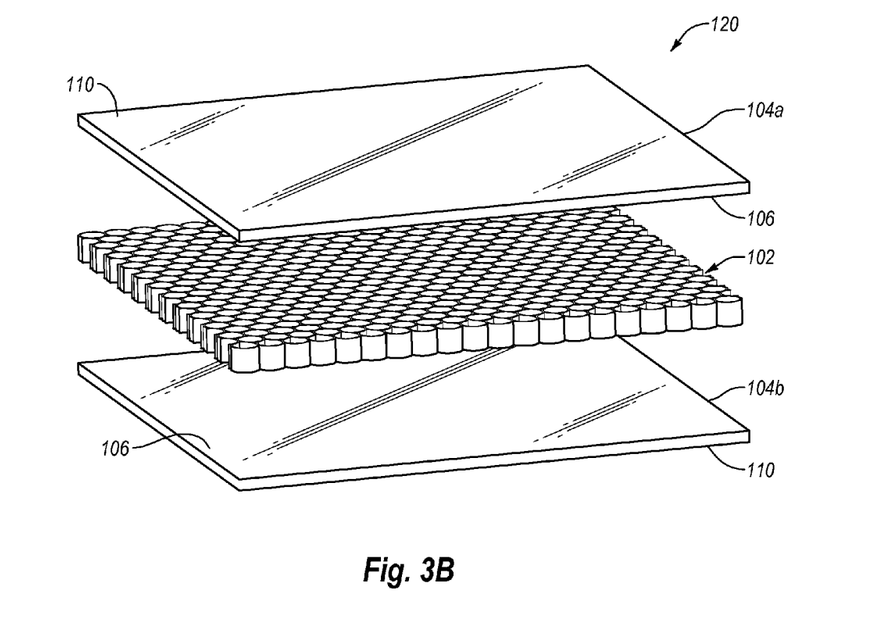
FIG. 3B illustrates an exploded perspective-view of the laminate assembly of FIG. 3A.

FIG. 3A illustrates an overview of a laminate assembly 120 for use as a precursor in creating a structured-core laminate panel 100. Similarly, FIG. 3B illustrates an exploded view of the components of the laminate assembly 120 of FIG. 3A, albeit rotated into a 3D view. In particular, FIGS. 3A-3B illustrate a sequential overview in accordance with an implementation of the present invention for positioning components of the laminate assembly 120 prior to subjecting the components to a lamination process.

For example, FIGS. 3A-3B illustrate that a laminate assembly 120 in accordance with an implementation of the present invention can include opposing resin-based substrates or sheets 104a, 104b. Each resin substrate 104a, 104b can include an outer surface 110, and an opposing inner surface 106. The resin-based substrates 104a, 104b can be formed from any of the materials described herein above in defining "resin-based," and can be translucent or transparent. Additionally, the resin-based substrates 104a, 104b can comprise a laminate of multiple layers of the same or different compatible materials.

Furthermore, the resin-based substrates 104a, 104b can be any appropriate thickness for the resulting thickness of a final structured-core laminate panel 100, such as about two inches (2"), about one inch (1"), about one-half inch (½"), about one-fourth inch (¼"), about one-eighth inch (⅛"), about one-sixteenth inch (1/16"), or about one-thirty-second inch (1/32") in thickness or gauge as desired. In some implementations of the present invention, the opposing resin substrates 104a, 104b can have similar thicknesses as shown in FIGS. 3A and 3B. In alternative implementations, the thicknesses of the resin substrates 104a, 104b may differ. For example, a manufacturer may intend to use the resulting structured-core laminate panel 100 as a floor structure, and therefore, increase the thickness of one of the resin substrates 104a, 104b upon which people will walk.

Additionally, the size (i.e., surface area of sides 106 or 110) of the resin-based substrates 104a, 104b can also be any appropriate size for the desired size of resulting structured-core laminate panel 100. In at least one implementation, for example, the resin-based substrate 104a, 104b can be about four feet by about eight feet (4'×8'), about four feet by about ten feet (4'×10'), about six feet by about fifteen feet (6'×15'), or taller/wider. Or alternatively, the resin-based substrate 104a, 104b can be about six inches by about six inches (6"×6") or shorter/skinnier. Thus, a manufacturer can tailor both the gauge and size of the resin-based substrate 104a, 104b depending upon the desired dimensions of a resulting structured-core laminate panel 100.

The structured core 102 can have any size relative to the size (i.e., surface area) as the surfaces 106 of the resin-based substrates 104a, 104b. For example, FIGS. 3A and 3B illustrate that the structured core 102 can have approximately the same size (i.e., surface area) as the surfaces 106 of the resin-based substrates 104a, 104b against which the structured core 102 is abutted. Alternatively, the resin substrates 104a, 104b can extend beyond the edges of the structured core or vice versa.

FIGS. 3A-3B also depict that the laminate assembly 120 can include one or more structured cores 102 placed next to, or against, one or more surfaces 106 of the resin-based substrates 104a, 104b. As shown in FIGS. 3A-3B, a manufacturer can abut the structured core 102 directly against the adjacent surfaces 106 of the resin substrates 104a, 104b without out any intervening adhesive liquids, films or other layers. This can ensure that resin of the resin substrates 104a, 104b are mechanically and/or chemically bonded directly to the structured core 102 during the lamination process.

Figure 4A:
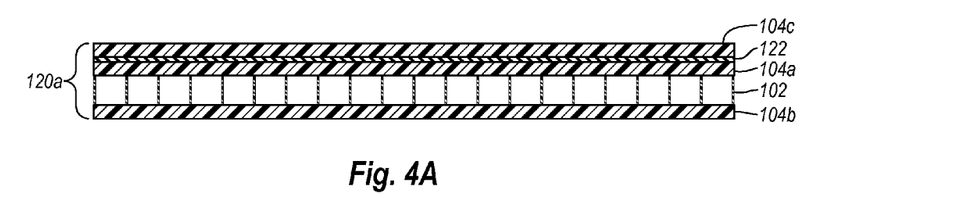
FIG. 4A illustrates a side, cross-sectional view of another laminate assembly that a manufacturer may use in forming a structured-core laminate panel in accordance with an implementation of the present invention.
Figure 4B:
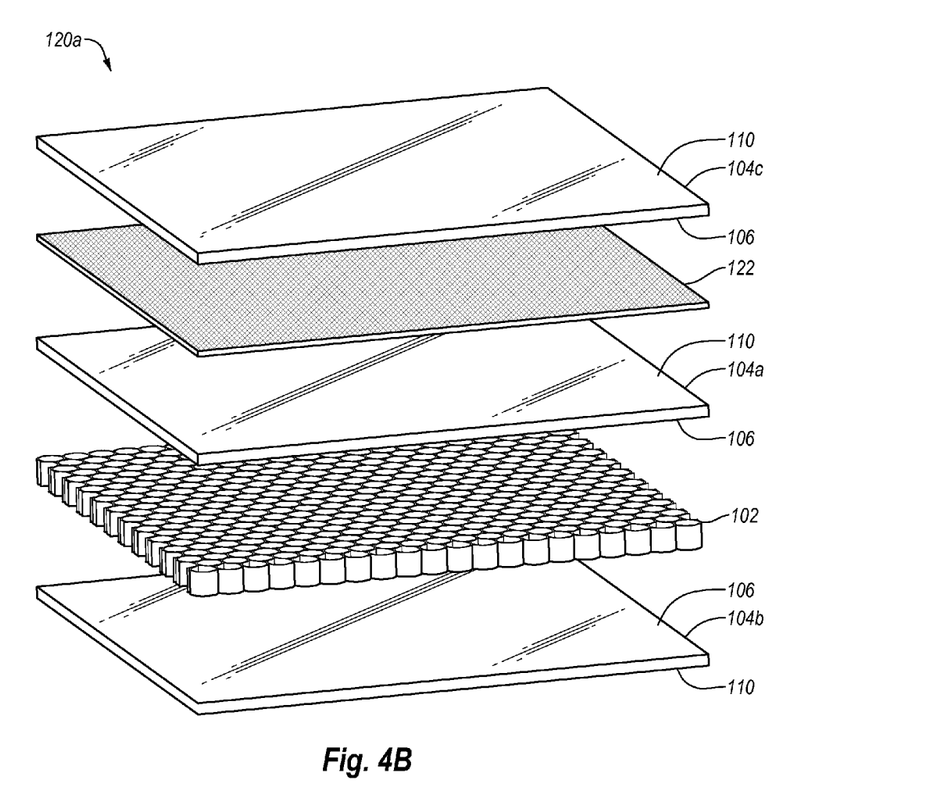
FIG. 4B illustrates an exploded perspective-view of the laminate assembly of FIG. 4A.

In some cases, the manufacturer may also include other decorative items between or on the outer surfaces 110 of the resin substrate substrate(s) 104a, 104b in order to add any number of decorative effects. For example, FIGS. 4A-4B illustrate another implementation of a laminate assembly 120a that includes a decorative image layer 122. In particular, FIG. 4A illustrates a cross-sectional view of a laminate assembly 120a for use as a precursor in creating structured-core laminate panel. Similarly, FIG. 4B illustrates an exploded view of the components of the sublimation laminate assembly 120a in FIG. 4A, albeit rotated to show as a 3D view.

One will appreciate that there are a wide variety of decorative image layers that a manufacturer can add to the laminate assembly 120a to create a wide variety of effects. For example, the decorative image layer can comprise fabric, metallic wire, rod and/or bar, papers or printed or photographic images, crushed glass, and vegetation, such as wood chips, grasses, flowers, wheat, and thatch. The decorative image layer may display images or decorative designs or may be of a solid color. The melting point of the decorative image layer should be sufficiently high to avoid any degradation or distortion of the decorative image layer during the manufacture or processing of the laminate assembly. In some implementations, the decorative image layer(s) 122 is substantially continuous, and constitutes a distinct image layer or laminate, such as the decorative image layer 122 in FIGS. 4A and 4B. Alternatively, the decorative image layer(s) 122 can be made of discontinuous segments, particularly when the decorative image layer comprises wire or vegetation.

As shown in FIGS. 4A and 4B, in some implementations the decorative images layer 122 can comprise one or more color or performance film layers (such as a light diffusion layer or graphic film). With particular regard to a colored film layer, the decorative image layer 122 can impart a color to the structured-core laminate panel 100 during the lamination process (e.g., as opposed to having already provided color during extrusion). The decorative image layer 122, when a color film, preferably ranges from about 0.0254 mm (0.001 inch) to about 1.524 mm (0.06 inch) in thickness, and more preferably 0.0254 mm (0.001 inch) to 0.05 mm (0.002 inch), and most preferably about 0.04 mm (0.0015 inch) in thickness. Polymeric films thinner or thicker may be used in the decorative image layer 122, depending on the equipment available, and under such conditions the thickness is limited only by functionality. Furthermore, a manufacturer can combine different colored films in the decorative image layer 122 to make a single, uniformly colored structured-core laminate panel 100.

Combination through lamination or adhesion of such film layers of differing colors creates a uniform colored panel that is a composite color of the individual film colors used to construct the laminate assembly 120a. Furthermore, so long as the colors selected are effectively transparent, the color ordering of colored films is not important as the color and hue of the panel remains the same throughout the finished panel regardless of viewing direction and ordering of the films on or within the resin substrates 104. In addition to varying the color of a resulting structured-core laminate panels 100, a manufacturer can use the decorative image layer 122 (and any films making up the decorative image layer 122) to vary the hue and/or translucency of a resulting structured-core laminate panel 100.

FIGS. 4A and 4B illustrate that a manufacturer can place the decorative image layer 122 against one or more of the outer surfaces 110 of the resin substrates 104a, 104b. For example, FIGS. 4A and 4B illustrate a decorative image layer 122 against the outer surface 110 of the upper resin substrate 104a. In addition to the decorative image layer 122, FIGS. 4A and 4B illustrate that the manufacturer can add yet another outer resin substrate 104c to the laminate assembly 120a. One will appreciate that, in some cases, the manufacturer could omit resin substrate 104b on one side and keep substrates 104a and 104c on the other side of the structured core 102.

Additionally, the decorative image layer 122 need not necessarily be between two outer resin substrates 104b and 104c. For example, in at least one implementation, a manufacturer can position the decorative image layer 122 between the substrate 104b and/or 104a so that the decorative image layer 122 interfaces between the structured core 102 and the resin substrate(s) 104a, 104b. In further implementations, the manufacturer can apply the decorative image layer 122 directly to the outside surface 110 of substrate 104a (and/or 104b), as shown, but omit the third resin substrate 104c (or any other possible additional substrates 104 not shown). In either case, the manufacturer can achieve essentially the same color result in the resulting structured-core laminate panel 100.

Still further, one will appreciate that the manufacturer can construct the laminate assembly 120, 120a with a wide range of thermoplastic materials, which provide suitable properties in accordance with implementations described herein. In one implementation, for example, the manufacturer can use a structured core 102 comprised of polycarbonate materials, but use resin substrates 104 comprising glass transition temperatures that are lower than that for polycarbonate. Such lower glass transition temperature materials used in resin substrates 104 can comprise of any number of thermoplastic sheet materials including copolyesters, acrylic materials, and/or mixtures thereof.

In one implementation, in particular, the manufacturer prepares a laminate assembly 120, 120a with a polycarbonate structured core 102, and further with acrylic materials as the next adjacent resin substrate(s) 104a or 104b. The manufacturer can further use a colored film layer as a decorative layer 122 adjacent the acrylic layer 104a or 104b, whereby the thin colored film decorative layer 122 comprises colorant loaded acrylic films (although other colored thin films such as EVA or TPU may be utilized). In this implementation, the manufacturer can also optionally use another outer layer 104c, though this is not required for all implementations. In such a case, the other outer layer 104c adjacent the colored film decorative layer 122 can comprise a thermoplastic sheet such as acrylic or copolyester (e.g., PETG), or mixtures thereof.

In another implementation, the manufacturer prepares a laminate assembly 120, 120a with a polycarbonate structured core 102, and further uses acrylic or copolyester uniformly for all of the resin substrate layers 104a, 104b, and/or 104c, and the colored film decorative layer 122. In still further implementations, the manufacturer prepares a laminate assembly 120a using all three (or more) illustrated substrates 104a, 104b, and 104c (or more than those illustrated), and further applies a colored film decorative layer 122 to the outside thereof (e.g., on the outer surface 110 of substrate 104c).

In addition to the foregoing, the manufacturer may apply other components to the laminate assembly as may be required for applying temperature and pressure. In one implementation using conventional heat presses (thereby utilizing mechanical pressure and conductive heating and cooling), for example, the manufacturer can surround the sheet laminate assembly with one or more pressure pads, one or more metal plates, and/or one or more texture papers (to impart still further aesthetic effects). The pressure pads and/or metal plates can equalize pressure and temperature across the entire surface of the laminate assembly 120, 120a. By contrast, the texture papers can impart any number of different textures or glosses on the resin substrates 104 during lamination.

Upon preparing the laminate assembly 120, 120a, the manufacturer then applies appropriate heat and pressure to form a structured-core laminate panel 100. In at least one implementation, the manufacturer applies enough heat and pressure to cause the one or more resin substrates 104a, 104b to melt at the interface with the structured core 102, without causing the structured core 102 to melt or deform. Furthermore, the temperature and pressure can be sufficient to avoid causing any deformation in the outer surfaces 110 of the resin substrates 104a, 104b, 104c, such as any dimpling due to collapse on an opposing side of the resin substrate 104 into any particular cell/chamber 108.

In particular, the manufacturer can heat the sheet assembly 120, 120a to a processing temperature sufficient to soften or at least partially melt the resin substrates 104, but not high enough to soften or melt the structured core 102. Thus, the manufacturer can heat the sheet assembly to a processing temperature at least as great as the glass transition temperature of the resin substrate(s) 104, but below the melt or glass transition temperature of the structured core 102. Along related lines, the manufacturer can apply a processing pressure to the laminate assembly 120, 120a sufficient to cause softened or melted resin of the resin substrates 104a, 104b to flow into the cells 108 of the structured core 102, but not so great as to damage the structured core 102.

In at least one implementation, the processing temperature is between about 180° F. and about 295° F. One will appreciate that varying resins can have a wide range of glass transition temperatures, and thus, the processing temperature can vary depending on which resins are used. For example, in an implementation using a polycarbonate structured core 102 and copolyester (e.g., PETG, PET, and PCTG) resin substrates 104, the appropriate processing temperature may be between about 180° F. to about 275° F. Alternatively, when using a polycarbonate structured core 102 and acrylic (e.g., PMMA) resin substrates 104, the appropriate processing temperature may be between about 190° F. to about 295° F., depending largely on the applied pressure.

For example, in at least one implementation, the manufacturer can implement a processing pressure that is between approximately 5 pounds per square inch (psi) and approximately 250 psi, and preferably between about 5 psi and about 50 psi for each such material. In an implementation in which the structured core 102 comprises polycarbonate and the opposing resin substrate(s) 104 comprise a copolyester material, the appropriate pressure can be about 40 psi.

As discussed herein, the structured core 102 in implementations of the present invention does not deform in any appreciable way since the above-mentioned temperatures do not elevate the materials of the structured core 102 to its melt or glass transition temperature (i.e., polycarbonate has a glass transition temperature that is usually achieved at temperatures higher than 300° F.). Similarly, the noted temperatures and pressures of the present invention do not elevate the materials of the structured core 102 to heat distortion temperatures. At a pressure of about 66 psi, the heat distortion temperature for a polycarbonate structure would be about 280° F. Of course, however measured, the primary point in at least one implementation is that the polycarbonate structured core 102 will not be at its glass transition temperature or heat distortion parameter(s), even if the adjacent resin substrate(s) 104 is at such parameters.

One will appreciate that a manufacturer can apply the processing temperature(s) and pressure(s) to the laminate assembly 120, 120a to form a structured-core laminate panel 100 in any number of different apparatus. For example, in some implementations the manufacturer can place the laminate assembly 120, 120a within a thermosetting press. In general, the thermosetting press can include upper and lower platens configured to provide direct heat and pressure to both opposing sides of the given laminate assembly 120, 120a.

In addition to the foregoing, implementations of the present invention further include using an autoclave to apply the processing temperatures and pressures. For example, the manufacturer can place the laminate assembly 120, 120a into a vacuum bag. The manufacturer can then seal the edges of the vacuum bag, and remove air from the vacuum bag. The manufacturer can then place the vacuum bag within the autoclave, which applies equal heat and pressure in all directions on the laminate assembly 120, 120a. In general, an autoclave can heat the laminate assembly 120, 120a (e.g., via a convection process, rather than via conduction as with a mechanical press) with a controlled temperature profile.

One will appreciate that the autoclaving process can provide a number of additional benefits for creating an appropriate, aesthetically pleasing, structured-core laminate panel 100. For example, autoclaving is typically not constrained to one size/format (i.e., an autoclave can process a 2'×4' piece at the same time as an 8'×10' piece). In addition, in the autoclaving process, pressure can be continuous throughout heating and cooling cycles. This continuous pressure can keep the laminate assembly 120, 120a flat throughout the heating and cooling cycles, which can eliminate bowing. Further along these lines, autoclaving is a convective heating process that allows for more controlled heating and cooling at each direction about the sublimation assembly, and thus allows for equal temperatures at the same depth throughout each corresponding substrate's thickness. Again, since the temperature, and pressure, is uniformly distributed throughout each substrate, the autoclave can process multiple different sublimation assemblies without any warping/bowing, etc.

In addition to an autoclave process, yet another implementation for heating and pressurizing a laminate assembly 120, 120a can include use of a vacuum press. In particular, and as previously mentioned with respect to the autoclave process, a manufacturer can prepare a vacuum bag with a laminate assembly 120, 120a therein. The manufacturer can then position the vacuum bag into a vacuum press, and apply the appropriate processing temperatures and pressures. In another implementation, a manufacturer can place a laminate assembly 120, 120a (without a vacuum bag) in a vacuum press chamber, where air is evacuated prior to application of mechanical pressure.

Figure 5A:
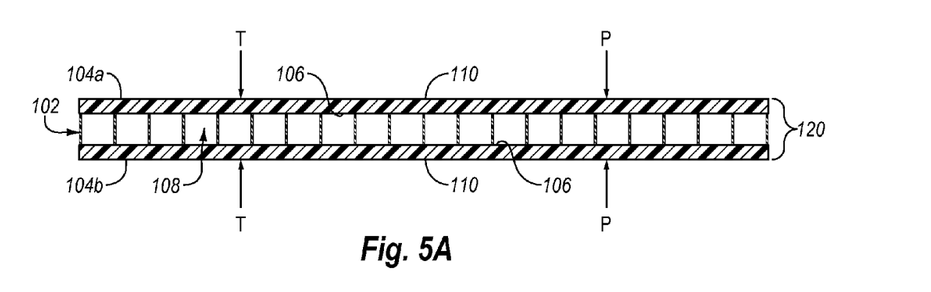
FIGS. 5A-5C illustrate a sequence of side, cross-sectional views of the laminate assembly of FIG. 3A when subjected to temperatures and pressures in accordance with an implementation of the present invention.
Figure 5B:
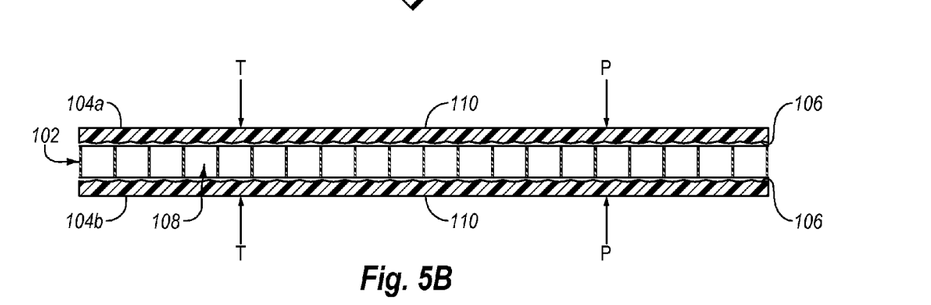
Figure 5C:
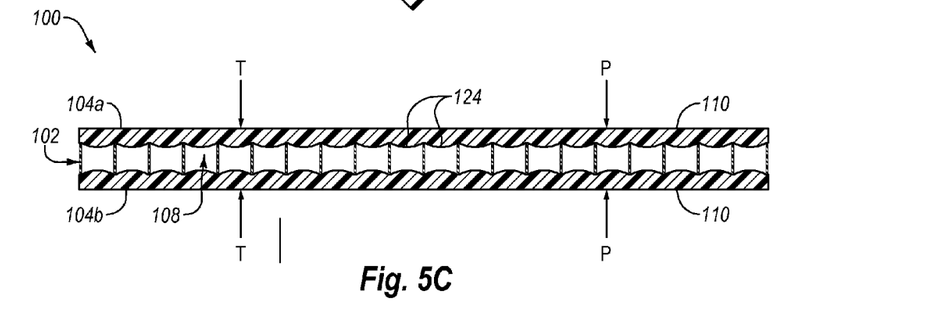

FIGS. 5A-5C illustrate a sequence of physical changes in an exemplary laminate assembly 120 being subjected to the appropriate processing temperature T and processing pressure P. For example, FIG. 5A illustrates a cross-sectional view of a laminate assembly 120. As shown in FIG. 5A, a manufacturer can apply processing temperature T and processing pressure P to the laminate assembly 120 using a thermosetting press, autoclave, vacuum press, or other thermosetting apparatus.

FIG. 5B illustrates the changes that the resin substrates 104a and 104b can undergo as the temperature of the resin substrates 230 reaches the processing temperature T (i.e., a temperature at or above the glass transition temperature of the resin substrates 104a, 104b). In particular, FIG. 5B illustrates that as the laminate assembly 120 reaches the processing temperature T, the resin substrates 104a, 104b begin to soften. In at least one implementation, the manufacturer applies the above processing pressure and temperature for about 11 minutes, of which about 6 minutes is raising the temperature in this range, while the remaining 5 minutes comprises holding materials at about 225° F. In alternative implementations the manufacturer can apply the above processing pressure and temperature for time intervals of greater than 11 minutes, or even less than 11 minutes.

In any event, during this time interval, the resin substrates 104a, 104b begin to flow, particularly at the inner surfaces 106 abutting the structured core 102. As discussed, this generally occurs since the temperatures and pressures are sufficient to cause the resin substrate materials to meet or exceed their respective glass transition temperatures. As shown in FIG. 5B, for example, this causes the resin substrates 104a, 104b to deform at the respective inner surfaces 106.

FIG. 5C illustrates that once the resin materials of the resin substrates 104a, 104b have begun to melt, the pressure P causes resin to at least partially flow around, in, and/or through the chambers/cells 108 of the structured core 102. Nevertheless, the resin substrates melt in or around the cells 108 without causing significant melting or deformation of the structured core 102, or deforming the outer surfaces 110 of the resin substrates 104a, 104b. In particular, as the inner surfaces 106 of the resin substrates 104a, 104b become tacky, the resin materials at least partly mechanically attach to the structured core 102. Additionally, in some cases the resin materials also fuse to the structured core 102 and corresponding cells/chambers 108. As a result, one will appreciate that the bond between structured core 102 and resin substrates 104a, 104b is much stronger than conventional laminations.

FIG. 5C further illustrates that the final result of the lamination process (i.e., after resin substrates 104a, 104b have cooled below their respective glass transition temperatures)

includes one or more resin substrates 104a, 104b seamlessly bonded to a structured core 102. In particular, FIG. 5C illustrates that resin portions 124 of the resin substrates 104a, 104b extend into the cells/chambers 108 of the structured core 102. One will appreciate that by extending into the cells/chambers 108 of the structured core 102 the surface area of the bond between the resin substrates 104a, 104b is increased, thereby increasing the strength of the bond.

In addition, in implementations including a decorative image layer 122, such as a color film layer, and additional outer resin substrate(s) 104c, the processing temperatures and pressures will cause the outer surface 110 of the resin substrate 104c and the inner surface 106 of the resin substrate 104a to soften, become tacky and bond to the decorative image layer 122, and/or each other. In at least one implementation, such as where the resin substrate layers 104a and/or 104b, and 104c are translucent, the resin substrate layers 104 will substantially exhibit the color of the color film, often without any clear visual evidence of the presence of the color film in the final structured-core laminate panel 100.

As previously mentioned, manufacturers can modify implementations of the present invention in any number of ways to achieve a wide range of functional and/or aesthetic effects. In at least one implementation of the present invention, for example, the structured-core laminate panel 100 comprises one or more at least partly translucent resin substrates. The resin substrates can further comprise coloration in one form or another, such as by further including any dyes during the resin extrusion process, or by laminating still further colored films directly to the substrates (before, during, or after lamination with the structured core). In addition, one will appreciate that the structured cores themselves can be varied for a wide range of functional and/or aesthetic effects. For example, the structured cores can be varied in terms of size, pattern, cell geometry, spacing, depth, thickness, color, material, and translucence.

Figure 6:
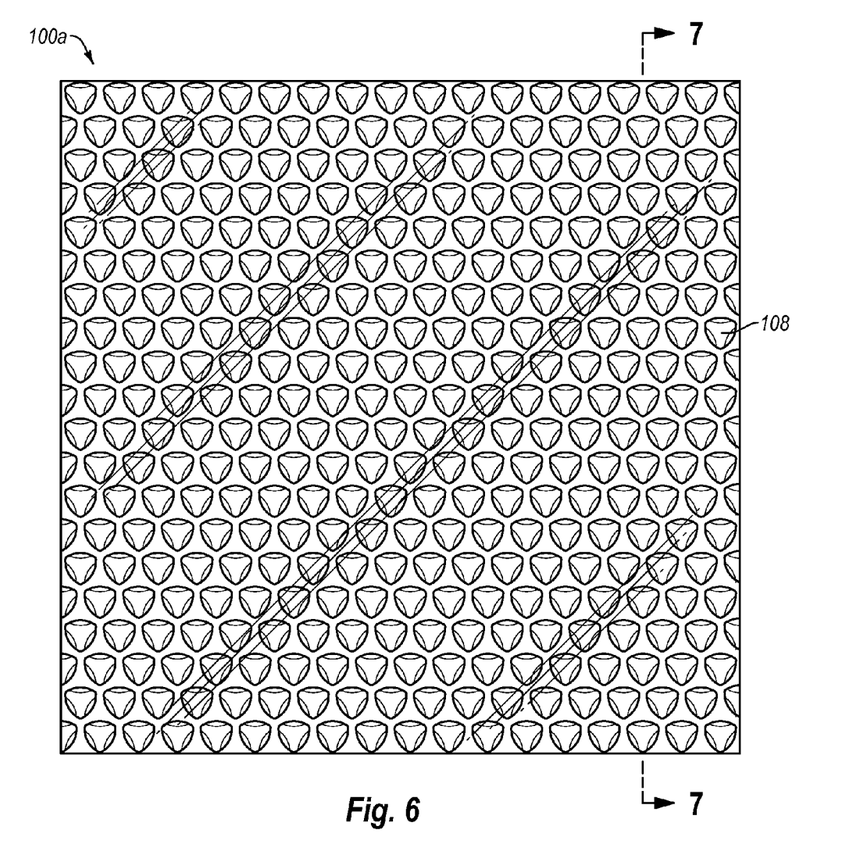
FIG. 6 illustrates a facing view of another structured core laminate panel in accordance with an implementation of the present invention.
Figure 7:
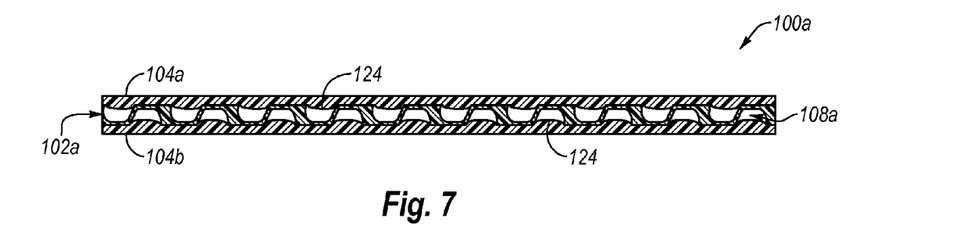
FIG. 7 illustrates a cross-sectional view of the structured-core laminate panel of FIG. 6 taken along the line 7-7 of FIG. 6.

For example, FIGS. 6 and 7 illustrates views of another structured-core laminate panel 100a in accordance with the present invention. Specifically, FIG. 6 illustrates a top view of the structured-core laminate panel 100a, while FIG. 7 illustrates a cross-sectional view of the structured-core laminate panel 100a taken along the line 7-7 of FIG. 6. As shown by FIGS. 6 and 7, the structured-core laminate panel 100a can include a structured core 102a laminated to opposing resin substrates 104a, 104b. More particularly, the structured core 102a can comprise a honeycomb structure with honeycomb cells 108a.

As shown by FIG. 6, the resin substrate 104a can be translucent, and can allow a user to view the honeycomb cells 108a therethrough. As previously mentioned, the cells of the structured core can include any number of geometries depending upon a desired aesthetic. For example, FIG. 6 illustrates that of the cells 108a of the structured core 102a can have the shape of a Reuleaux triangle. One will appreciate that the Reuleaux triangle shape of the cells 108a can provide a unique and desirable aesthetic.

Furthermore, FIG. 7 illustrates that resin portions 124 of the resin substrates 104a, 104b can harden into a mushroom shaped plug, which can result in a mechanical interlock with the cells 108a. Thus, the lamination process of the present invention can form a bond between the resin sheets 104a, 104b and the structured core 102a that is sufficiently strong to avoid delamination even under extreme conditions. Such extreme conditions may include dynamic and static loads, wide fluctuations in temperature, peeling forces or forceful impacts. In view of such properties, one will appreciate that the structured-core laminate panels 100, 100a made in accordance with the present invention can function in a wide range of applications, including as building components.

Figure 8:
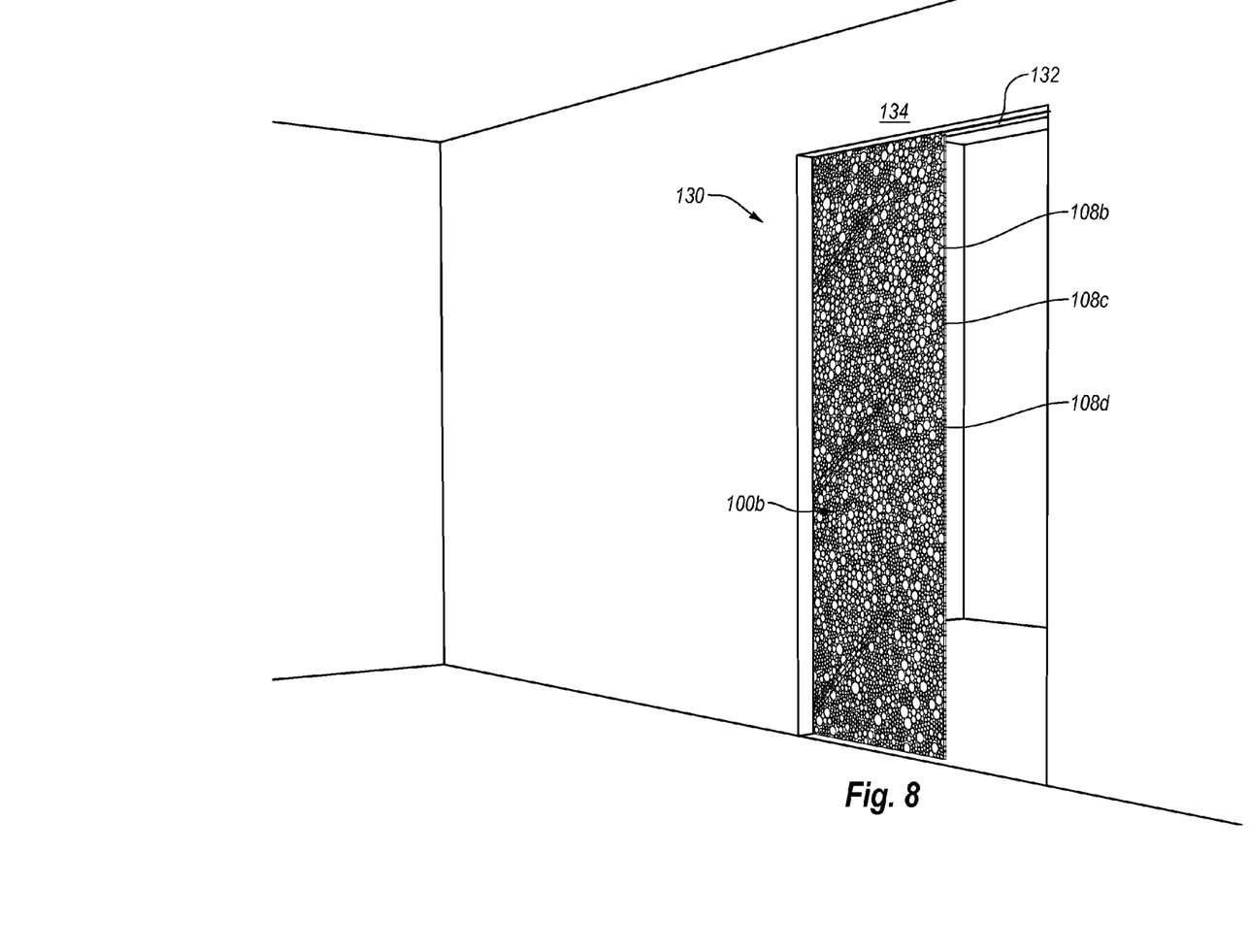
FIG. 8 is schematic view of panel system including a structured-core laminate panel secured to a support structure as a sliding door.

For example, FIG. 8 illustrates a panel system 100 including a structured-core laminate panel 100b. More particularly, FIG. 8 illustrates a mounting system 132 (i.e., sliding door suspension tracks) securing a structured-core laminate panel 100b to a support structure 134 as a sliding door. One will appreciate that the structured-core laminate panel 100b may be particularly suited for use as a partition, such as a sliding door, because of its lightweight yet strong configuration.

Furthermore, one will appreciate that the cells of the structured-core laminate panel 100c can provide a unique aesthetic. As mentioned previously, the cells of the structured core can have a wide variety of shapes and configurations. Additionally, the cells 108 of a particular structured-core laminate panel need not be uniform. For example, FIG. 8 illustrates a structured core including cells 108 with various different sizes (i.e., large sized cells 108b, medium sized cells 108c, and small sized cells 108d).

One will appreciate that a manufacturer can design or configure the structured core to provide varying degrees of privacy. Thus, the structured-core laminate panel 100b can function as a partition that provides both light transmission and privacy. Indeed, a manufacturer can modify the color and opacity/translucence of the structured-core laminate panel 100b in any number of ways to adjust the opacity/transparency of the structured-core laminate panel 100b for desired aesthetic effect. For instance, in at least one implementation, a manufacturer can modify the hue, color intensity, and light transmission of the structured core and/or the decorative image layer 122 to vary the resultant aesthetic properties of the structured-core laminate panel 100b. Accordingly, one will appreciate that implementations of the present invention provide a manufacturer with a number of ways to prepare a structurally useful, aesthetically desirable panel. These panels can have a wide range of shapes, sizes, thicknesses, properties or colors, and can be used in a wide range of environments and applications.

Figure 9:
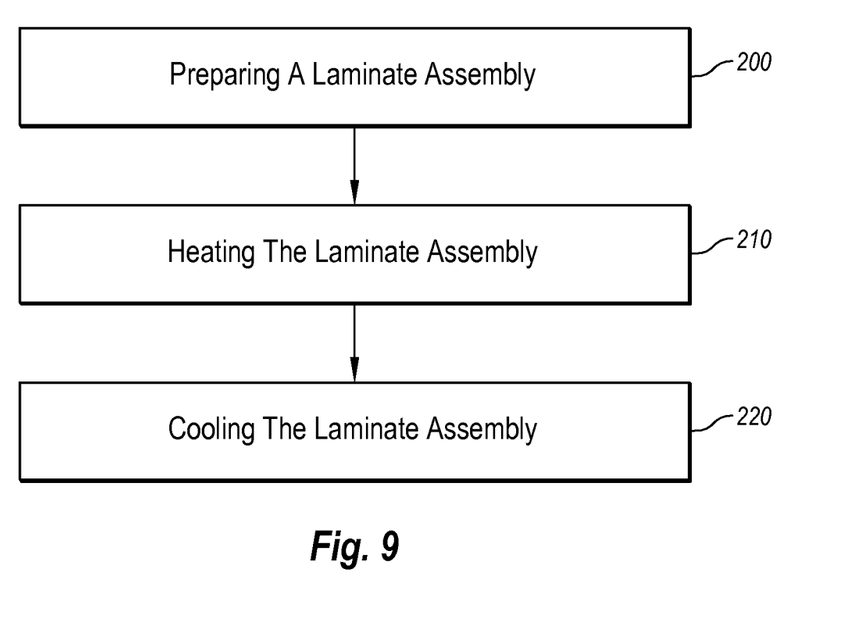
FIG. 9 illustrates a chart of acts and steps in a method of forming a structured core laminate panel in accordance with an implementation of the present invention.

Accordingly, FIGS. 1-8, the corresponding text, provide a number of different components and mechanisms for creating structured-core laminate panels 100 in an efficient, aesthetically pleasing way. In addition to the foregoing, implementations of the present invention can also be described in terms of flowcharts comprising acts and steps in a method for accomplishing a particular result. For example, FIG. 9 illustrates a flowchart of one exemplary method for producing a structured-core laminate panel 100, 100a, 100b using principles of the present invention. The acts of FIG. 9 are described below with reference to the components and diagrams of FIGS. 1 through 8.

For example, FIG. 9 shows that a method of creating a structured-core laminate panel 100c comprises an act 200 of preparing a laminate assembly 120, 120a. Act 200 includes positioning one or more resin substrates about a structured core. More specifically, act 200 includes positioning one or more resin substrates having a first glass transition temperature about a structured core having a second melt or glass transition temperature greater than the first glass transition temperature. For instance, a manufacturer can position resin substrates 104a, 104b, 104c formed from a copolyester or acrylic material about a structured core 102, 102a formed from a polycarbonate material. The manufacturer can then place the opposing resin substrates 104a, 104b directly against a structured core 102, 102a without any adhesive films or other layers between the resin substrates 104a, 104b and the structured core 102, 102a.

In addition, FIG. 9 shows that the method can comprise an act 210 of heating the laminate assembly 120, 120a. Act 210 includes heating the laminate assembly to a processing temperature at least as great as the glass transition temperature of the outer substrates 104a, 104b but below the melt or glass transition temperature of the structured core 102, 102a. In connection with act 210, a portion of the one or more resin substrates flows into the structured core. For example, a manufacturer can heat the laminate assembly 120, 120a to a temperature of between about 180° F. and about 275° F., such as to a temperature of about 225° F. The manufacturer can heat the laminate assembly in a lamination press, autoclave, vacuum bag, or other thermosetting environment. In an autoclave, a manufacturer may further perform the lamination by inserting the materials of the above-described laminate assembly into a vacuum bag.

FIG. 9 also shows that the method comprises act 220 of cooling the laminate assembly. Act 220 can include cooling the laminate assembly below the first glass transition temperature to create a unitary structured-core laminate panel. For example, a manufacturer can place the laminate assembly 120, 120a into a cold press or simply position can position the laminate assembly 120, 120a so that ambient air can cool the laminate assembly 120, 120a. Upon cooling, portions 124 of the resin substrates 104a, 104b within the structured core 102, 102a can harden and form a mechanical bond unifying the resin substrates 104a, 104b and the structured core 102, 102a. In some implementations, in addition to the mechanical bond, a chemical bond can form between the resin substrates 104a, 104b and the structured core 102, 102a.

Accordingly, the schematics and methods described herein provide a number of unique products, as well as ways for creating aesthetically pleasing, decorative, architecturally-suitable panels with structured cores. As discussed herein, these panels can be substantially translucent or transparent in order to provide a desired aesthetic. Furthermore, the implementations of the present invention provide methods of bonding a structured core to one or more resin substrates without damaging or degrading the structured core during processing. Accordingly, implementations of the present invention can create not only a structured-core laminate panel with pleasing aesthetics, but also a panel that is sufficiently strong to avoid delamination even under extreme conditions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A panel system configured for use as a partition that provides both light transmission and privacy while displaying a structured core through one or more transparent resin substrates, comprising:
   one or more first translucent structured-core laminate panels, comprising:
      one or more first thermoplastic, transparent resin substrates having a first glass transition temperature, and
      one or more structured cores including a plurality of hollow chambers, the one or more structured cores having a second melt or glass transition temperature that is greater than the first glass transition temperature,
   wherein a portion of the one or more first thermoplastic, translucent resin substrates has flowed into the hollow chambers, such that the one or more first thermoplastic, transparent resin substrates is deformed and extends into, and is mechanically attached to, the plurality of hollow chambers of the one or more structured cores without any intervening adhesive film layer, and without any deformation of the structured core;
   wherein the plurality of hollow chambers of the one or more structured cores is displayed through the one or more transparent resin substrates without any dimpling or deformation caused by deformation with the structured core on the opposing side; and
   a mounting system that secures the one or more translucent structured-core laminate panels to a support structure.

2. The panel system as recited in claim 1, wherein the mounting system comprises hardware that supports the one or more translucent structured-core laminate panels as a sliding door.

3. The panel system as recited in claim 1, wherein the mounting system comprises hardware that supports the one or more translucent structured-core laminate panels as a partition.

4. The panel system as recited in claim 1, further comprising a colored film fused to an outside surface of one of the one or more first translucent resin substrates.

5. The structured-core laminate panel as recited in claim 4, further comprising:
   one or more outer translucent resin substrates fused to the colored film;
   wherein the colored film is positioned between the first resin substrate and the one or more outer resin substrates.

6. The panel system as recited in claim 1, further comprising one or more second translucent resin substrates mounted on an opposing side of the one or more structured cores.

7. The structured-core laminate panel as recited in claim 6, wherein the at least one structured-core comprises polycarbonate, and each of the first and one or more second translucent resin substrates comprise a copolyester material.

8. The panel system as recited in claim 1, wherein the one or more first resin substrates comprise a sheet having a thickness from about 1/16 inch to about 5 inches.

9. A panel system configured for use as a partition that provides both light transmission and privacy while displaying a structured core through one or more transparent resin substrates, comprising:
   at least a first transparent resin substrate and a second transparent resin substrate, both consisting essentially of a thermoplastic material having a first glass transition temperature, the thermoplastic material enabling the formed panel to be shaped and re-shaped after heating;
   at least one structured-core comprising a plurality of hollow chambers, the at least one structured core being mechanically attached directly without deformation of the plurality of hollow chambers, but with deformation of respective contacting sides of the first and second transparent resin sheets, the mechanical attachment comprising no intervening adhesive film layer;
   wherein:
      the at least one structured core has a second melt or glass transition temperature that is higher than the first glass transition temperature;
      a portion of both the first and second resin substrates has flowed into the hollow chambers, such that the contacting sides of the first and second resin substrates have been deformed, and extend into the plurality of hollow chambers of the at least one structured core without deformation or dimpling on the opposing side thereof; and the at least one structured core is visible through both of the first and second transparent resin substrate, such that the at least one structured core is viewable on opposing sides through the first and second transparent resin substrates;

a mounting system that secures the first structured-core laminate panels to a wall or ceiling, such that the system provides an attached partition that displays the plurality of hollow chambers;

wherein each of the first and second transparent resin substrates comprises a sheet having a thickness from about 1/16 inch to about 5 inches.

10. The panel system as recited in claim 9, wherein the mounting system comprises hardware that supports the one or more translucent structured-core laminate panels as a sliding door.

11. The structured-core laminate panel as recited in claim 9, further comprising a colored film fused to a second surface of the at least one resin substrate opposite the first surface.

12. The structured-core laminate panel as recited in claim 11, further comprising:
a third resin substrate fused to the colored film;
wherein the colored film is positioned between the first resin substrate and the second or third resin substrate.

13. The structured-core laminate panel as recited in claim 9, wherein the at least one structured-core comprises polycarbonate and each of the resin substrates comprise a copolyester material.

14. The structured-core laminate panel as recited in claim 9, wherein the plurality of hollow chambers of the at least one structured-core comprise honeycomb cells.

15. The structured-core laminate panel as recited in claim 9, wherein the plurality of hollow chambers of the at least one structured-core comprise cylindrical-shaped cells oriented perpendicularly to the first surface of the at least one resin substrate.

16. The structured-core laminate panel as recited in claim 9, wherein the plurality of hollow chambers comprise cells having at least three different sizes, such that each different size of each cell is viewable outside of the first or second translucent resin substrate.

17. The panel system as recited in claim 1, wherein the mounting system comprises hardware that supports the one or more translucent structured-core laminate panels as a treatment to a ceiling, floor, or wall.

18. A panel system configured for use as a partition that provides both light transmission and privacy while displaying a structured core through one or more transparent resin substrates, comprising:

at least one resin substrate, wherein the at least one resin substrate comprises a transparent thermoplastic resin sheet having a first glass transition temperature; and at least one structured-core laminated and mechanically bonded directly to a first surface of the at least one resin substrate to create a structured core laminate panel, the at least one structured-core comprising a plurality of hollow chambers;

wherein:
a portion of the at least one resin substrate positioned directly against the at least one structured core has flowed into the hollow chambers, such that the at least one resin substrate is fused to, extends into, and is mechanically interlocked with the plurality of cells of the at least one structured core; and the at least one resin substrate provides both a direct bond to the at least one structured core on one side while maintaining a substantially planar outer surface to the structured core on an opposing side;

a mounting system that secures the structured core laminate panel to a wall or ceiling, such that the system provides an attached partition that displays each of the resin cells in the plurality;

wherein the at least one resin substrate is from about 1/16 inch to about 5 inches in thickness.

19. The panel system as recited in claim 17, further comprising a colored film fused to an outside surface of one of the one or more first translucent resin substrates.

20. The panel system as recited in claim 19, further comprising:
one or more outer translucent resin substrates fused to the colored film;
wherein the colored film is positioned between the first resin substrate and the one or more outer resin substrates.

21. The panel system as recited in claim 17, wherein the structured core comprises polycarbonate.

22. The panel system as recited in claim 17, further comprising one or more second resin substrates mounted on an opposing side of the at least one structured core.

23. The structured-core laminate panel as recited in claim 22, wherein the at least one structured-core comprises polycarbonate, and two of the resin substrates comprise a copolyester material that is mechanically interlocked with the structured-core without deformation of the structured core.

24. The panel system as recited in claim 17, wherein the mounting system comprises sliding door suspension tracks for securing the structured core laminate panel to a support structure as a sliding door.

* * * * *

UNITED STATES PATENT AND TRADEMARK OFFICE
CERTIFICATE OF CORRECTION

| | | |
|---|---|---|
| PATENT NO. | : 9,091,067 B2 | |
| APPLICATION NO. | : 14/244135 | |
| DATED | : July 28, 2015 | |
| INVENTOR(S) | : Brewster et al. | |

It is certified that error appears in the above-identified patent and that said Letters Patent is hereby corrected as shown below:

Drawings
Fig. 6, change "108" to --108a-- (See attached)

Specification
Column 5
Line 40, change "degrees transparency" to --degrees of transparency--

Column 7
Line 6, change "into create" to --to create--

Column 8
Line 18, change "as the surfaces" to --of the surfaces--
Line 31, change "without out" to --without--

Column 12
Line 29, change "substrates 230 reaches" to --substrates 104a and 104b reach--

Column 14
Line 3, change "system 100" to --system 130--
Line 13, change "panel 100c" to --panel 100b--
Line 40, change "1-8, the" to --1-8 and the--
Line 53, change "panel 100c" to --panel 100, 100a, 100b--

Column 15
Line 22, change "simply position can position" to --can position--

Signed and Sealed this
Twenty-ninth Day of March, 2016

Michelle K. Lee
*Director of the United States Patent and Trademark Office*

Fig. 6